(12) United States Patent
Kanitz et al.

(10) Patent No.: US 8,373,918 B2
(45) Date of Patent: Feb. 12, 2013

(54) ELECTROCHROMIC ORGANIC COMPONENT

(75) Inventors: Andreas Kanitz, Höchstadt (DE); Wolfgang Roth, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 6 days.

(21) Appl. No.: 12/998,251

(22) PCT Filed: Sep. 22, 2009

(86) PCT No.: PCT/EP2009/062228
§ 371 (c)(1),
(2), (4) Date: Mar. 30, 2011

(87) PCT Pub. No.: WO2010/037662
PCT Pub. Date: Apr. 8, 2010

(65) Prior Publication Data
US 2011/0199665 A1    Aug. 18, 2011

(30) Foreign Application Priority Data
Sep. 30, 2008    (DE) .......................... 10 2008 049 543

(51) Int. Cl.
- *G02F 1/15* (2006.01)
- *G02F 1/00* (2006.01)
- *G02B 5/23* (2006.01)

(52) U.S. Cl. ......... 359/265; 359/321; 252/583; 252/586

(58) Field of Classification Search ........ 359/265–275; 252/583, 586
See application file for complete search history.

(56) References Cited

U.S. PATENT DOCUMENTS

| | | | | |
|---|---|---|---|---|
| 5,278,693 A | * | 1/1994 | Theiste et al. | 359/272 |
| 5,294,376 A | * | 3/1994 | Byker | 252/600 |
| 5,336,448 A | * | 8/1994 | Byker | 252/583 |
| 6,248,263 B1 | | 6/2001 | Tonar et al. | |
| 6,734,305 B2 | * | 5/2004 | Pierre et al. | 544/347 |
| 7,450,292 B1 | * | 11/2008 | Burrell et al. | 359/270 |
| 2009/0040589 A1 | | 2/2009 | Kanitz et al. | |
| 2011/0181938 A1 | * | 7/2011 | Kanitz et al. | 359/266 |

FOREIGN PATENT DOCUMENTS

| | | |
|---|---|---|
| DE | 10 2008 049 543.3 | 9/2008 |
| EP | 1 443 090 | 8/2004 |
| EP | PCT/EP2009/062228 | 9/2009 |
| JP | 60-28624 | 2/1985 |
| WO | 03/021345 | 3/2003 |
| WO | 2007/006767 | 1/2007 |
| WO | 2008/022988 | 2/2008 |
| WO | 2008/083861 | 7/2008 |

OTHER PUBLICATIONS

Oota Tatsuo et al., "Manufacture of Display Element," Abstract only, XP-002561946, Database Epodoc, European Patent Office, Feb. 13, 1985, 1 page.
International Search, Report for PCT/EP2009/062228, mailed on Feb. 1, 2010.

* cited by examiner

*Primary Examiner* — Loha Ben
(74) *Attorney, Agent, or Firm* — Staas & Halsey LLP

(57) ABSTRACT

An organically based electrochromic component, e.g. for the production of displays and/or state indicators produces at least two colors. For the first time, two colors can be switched according to the voltage by using a dye system of 4,4'-bipyridinium salts.

11 Claims, No Drawings

ELECTROCHROMIC ORGANIC COMPONENT

CROSS REFERENCE TO RELATED APPLICATIONS

This application is based on and hereby claims priority to International Application No. PCT/EP2009/062228 filed on Sep. 22, 2009 and German Application No. 10 2008 049 543.3 filed on Sep. 30, 2008, the contents of which are hereby incorporated by reference.

BACKGROUND

The invention relates to an organically based electrochromic component.

Electrochromic displays based on organic materials normally comprise an active electrochromic layer which, in the case of a display, is located between electrodes disposed vertically with respect to one another. Constituents of the active layer are a redox system and a dye. The application of a voltage causes the ratio of concentrations of the redox partners with respect to one another to be shifted in the material. In this reaction, protons and/or ions are liberated or bound in the material. When a voltage is applied to the material, the shift of equilibrium of the redox partners present at the two electrodes runs in the reverse direction. This can be made visible, e.g., via pH-active dye.

A principle for implementing electrochromic displays is to produce the color change not by changing the pH value in the display but to use the redox processes taking place anyway to produce high-contrast color changes by creating reductive and/or oxidative states in suitable materials. Primarily the so-called viologens and polythiophenes have become well-known as material classes in this context. German Application Number DE 10 2005 032 316 (published as WO 2007/006767 and US 2009/0040589) discloses polymeric 4,4'-bipyridinium structures separated from one another by an alkene spacer which are eminently suitable for this purpose.

The disadvantage of the hitherto known systems is that only one color change can be achieved by applying a voltage.

SUMMARY

One possible object is therefore to create a formulation for an electrochromic cell in which two or more color changes are selectively switchable.

The inventors propose an organic electronic component, comprising two electrodes and a formulation based on the 4,4'-bipyridinium salts, with the 4,4'-bipyridinium salt as a dye and a whitening agent between the electrodes, wherein the 4,4'-bipyridinium salt is in a matrix comprising at least one poly(4-vinylphenol), a polyacrylonitrile and/or a 1-methyl-2-pyrrolidone, as well as any derivatives or mixtures thereof, so that two color changes can be selectively switched by adjusting the voltage. The polymer forming the matrix material has a molecular weight ranging from 50 to 50000. The also inventors propose an electrochromic organic component containing an electrochromically active formulation.

Surprisingly, it has been found that with the bipyridinium salt-dye system known from DE 10 2005 032 316, at a higher voltage, e.g. −2.5 to −3V, a broadly homogeneous "magenta" color impression can be created if the dye system is in a specific matrix. One such matrix system is formed from, for example, a dissolved poly(4-vinylphenol). Another matrix is formed, e.g., of 1-methyl-2-pyrrolidone or of 1-methyl-2-pyrrolidone and therein dissolved polyacrylonitrile.

DETAILED DESCRIPTION OF THE PREFERRED EMBODIMENT

Reference will now be made in detail to the preferred embodiments of the present invention, examples of which are illustrated below.

According to an advantageous embodiment, the formulation also contains a stabilizing agent in the form of a metal π-complex such as a metallocene, e.g., a ferrocene or a ferrocene derivative.

It is conceivable here that the poly(4-vinylphenol) is present in solution in an ether alcohol, e.g., a glycol such as diethylene glycol.

The polyacrylonitriles and polyvinylphenols must be regarded as whole families. Compounds that are commercially available are preferably used. It is assumed that an electronic interaction of the heteroatoms of the matrices with the $2^{nd}$ (violet) electronic state of the viologen specifically results in the second switchable state. In the case of the polyvinylphenol, those with an average molecular weight of approx. 8000 are preferably used. Another preferred polyvinylphenol has an average MW of 20000.

Known bipyridinium salts produce a violet color at higher voltage. The compounds are therefore also termed viologens. This color impression results from so-called "pimerization", a term taken to mean a stacking effect of the molecules because of their structure.

The bipyridinium salt known from DE 10 2005 032 316 avoids such pimerization effects and produces, e.g., at 1.5V, a pure blue color impression. However, if it is operated at a voltage greater than −2.5 to −3V, a broadly inhomogeneous color impression is produced in any matrices hitherto used.

This is characterized in that areas with blue-violet or reddish color impression are produced in a "blue environment". It is not possible to use this "magenta" color impression to produce components with, e.g., "magenta colored" symbols. The formulations used hitherto which were contained in the electrochromic components in a low molecular ether alcohol, e.g., diethylene glycol as a dispersing agent, also only have a limited lifetime at an operating voltage of −2.5 to −3V.

In the presence of the matrices, using a bipyridinium salt-dye system the "magenta" color can be displayed in a defect-free and reproducible manner even over a large surface area. It is therefore possible to reversibly switch one and the same dye system on a voltage-dependent basis from the uniform basic state to two different color impressions at the viewing electrode. Moreover, the lifetime of the component is significantly improved even at a higher operating voltage.

The matrices are surprising in that they facilitate and/or stabilize the formation of the "magenta" color stage of the bipyridinium salt-dye system, thereby making possible the selective display of a second, homogeneous color impression of a bipyridinium salt-dye system that cannot otherwise be achieved.

The component will now be explained in greater detail with reference to a number of examples:

1. Preparation of the Formulation with a Poly(4-Vinylphenol)/Diethylene Glycol Matrix 1.6 g poly(4-vinylphenol), MW=8000, are dissolved in 10 g diethylene glycol under heat with stirring. 6 g titanium dioxide, 0.6 g poly-N,N'(dodecylene)-bipyridinium dibromide and 0.23 g ferrocene are intensively mixed with 2 g of this cooled solution at 2000 RPM for 5 minutes using a speed mixer. A light, strongly viscous, spreadable paste is obtained.

2. Preparation of the Formulation with a 1-Methyl-2-Pyrrolidone Matrix 6 g titanium dioxide, 0.6 g poly-N,N'(dodecylene)-bipyridinium dibromide and 0.23 g ferrocene are intensively mixed for 5 minutes at 2000 RPM using a speed mixer. To this are added 2 g 1-methyl-2-pyrrolidone. Intensive mixing takes place at 2000 RPM for 5 minutes likewise using a speed mixer. A light, spreadable paste is obtained.

3. Preparation of the Formulation with a 1-Methyl-2-Pyrrolidone/Polyacrylonitrile Matrix 1 g polyacrylonitrile (Dralon) is dissolved in 10 g 1-methyl-2-pyrrolidone under heat with stirring. To 3 g of this cooled solution are added 2 g titanium dioxide, 0.3 g poly-N,N'(dodecylene)-bipyridinium dibromide and 0.12 g ferrocene and intensively mixed at 2000 RPM for 5 minutes using a speed mixer. A light-yellow, spreadable paste is obtained.

4. Production and Electrical Configuration of an Electrochromically Active Cell

The formulations in examples 1, 2 and 3 are screen-printed between two ITO-coated foils, with an adhesive frame delimiting the printed area. The adhesive frame also serves to bond the two foils together. The thickness of the printed layer is 30 μm. The electrochromic display element produced in this way has, in the basic state, a color impression corresponding to the formulation. The cell is electrically interconnected by applying a voltage of alternating sign, the following configurations being possible:

a) At a voltage of −1 to −1.5 V, a blue color impression is produced at the cathode. After polarity reversal the color impression of the initial state is restored. The color change can be initiated any number of times.

b) At a voltage of −2.5 to −3V, a "magenta" color impression is produced at the cathode. After polarity reversal the color impression of the initial state is restored. The color change can be initiated any number of times, passing through the blue color state.

The proposed component for the first time allows two colors to be switched at the viewing electrode according to the voltage by the dye system of 4,4'-bipyridinium salts.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. An organic electronic component, comprising:
   at least two electrodes; and
   a formulation between the electrodes, the formulation comprising a whitening agent and a 4,4'-bipyridinium salt as a dye, wherein the 4,4'-bipyridinium salt is in a matrix comprising at least one matrix material selected from the group consisting of a poly(4-vinylphenol), a polyacrylonitrile, a 1-methyl-2-pyrrolidone, and derivatives thereof, such that adjusting a voltage across the electrodes selectively switches the formulation between two color changes.

2. The component as claimed in claim 1, wherein at least one matrix material is present in solution in the formulation.

3. The component as claimed in claim 1, wherein the formulation further comprises a metallocene.

4. The component as claimed in claim 3, wherein the matrix material is dissolved in a glycol to form the matrix.

5. The component as claimed in claim 4, wherein the glycol is diethylene glycol.

6. The component as claimed in claim 5, wherein the matrix material in the formulation is a polymer with a molecular weight ranging from 50 to 50000.

7. The component as claimed in claim 6, wherein a first color change can be switched with a voltage in the range from −1 to −1.5 volts and a second color change can be switched with a voltage of −2.5 to −3 volts.

8. The component as claimed in claim 1, wherein the matrix material is dissolved in a glycol to form the matrix.

9. The component as claimed in claim 8, wherein the glycol is diethylene glycol.

10. The component as claimed in claim 1, wherein the matrix material in the formulation is a polymer with a molecular weight ranging from 50 to 50000.

11. The component as claimed in claim 1, wherein a first color change can be switched with a voltage in the range from −1 to −1.5 volts and a second color change can be switched with a voltage of −2.5 to −3 volts.

* * * * *